(12) United States Patent
Deneau

(10) Patent No.: US 8,156,286 B2
(45) Date of Patent: Apr. 10, 2012

(54) PROCESSOR AND METHOD FOR USING AN INSTRUCTION HINT TO PREVENT HARDWARE PREFETCH FROM USING CERTAIN MEMORY ACCESSES IN PREFETCH CALCULATIONS

(75) Inventor: Thomas M. Deneau, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 600 days.

(21) Appl. No.: 12/346,154

(22) Filed: Dec. 30, 2008

(65) Prior Publication Data

US 2010/0169606 A1 Jul. 1, 2010

(51) Int. Cl.
*G06F 12/08* (2006.01)
(52) U.S. Cl. ............ 711/137; 711/E12.004; 712/E9.047
(58) Field of Classification Search ................... 711/137, 711/145, E12.004; 709/235, 224, 225; 712/E9.047
See application file for complete search history.

(56) References Cited

U.S. PATENT DOCUMENTS

| | | | | |
|---|---|---|---|---|
| 5,958,040 | A | | 9/1999 | Jouppi |
| 6,151,662 | A | * | 11/2000 | Christie et al. ............... 711/137 |
| 6,393,527 | B1 | * | 5/2002 | Rao et al. ...................... 711/137 |
| 6,560,693 | B1 | * | 5/2003 | Puzak et al. .................. 712/207 |
| 6,987,697 | B2 | * | 1/2006 | Watanabe ................ 365/189.05 |
| 7,191,430 | B2 | | 3/2007 | Karp et al. |
| 7,418,494 | B2 | * | 8/2008 | Dahlin et al. ................. 709/224 |
| 7,533,242 | B1 | * | 5/2009 | Moll et al. ..................... 711/213 |
| 7,730,263 | B2 | * | 6/2010 | Burtscher et al. ............. 711/137 |
| 2004/0064577 | A1 | * | 4/2004 | Dahlin et al. ................. 709/235 |
| 2005/0210198 | A1 | | 9/2005 | Dimpsey |
| 2006/0149904 | A1 | * | 7/2006 | Mowry ......................... 711/137 |

OTHER PUBLICATIONS

A. Roth, A. Moshovos and G. Sohi, "Dependence Based Prefetching for Linked Data Structures," Proceedings of the Eighth International Conference on Architectural Support for Programming Languages and Operating Systems, pp. 115-126, 1998.*
Search report in application No. 09178486.8 mailed Apr. 21, 2010.

* cited by examiner

*Primary Examiner* — Pierre-Michel Bataille
(74) *Attorney, Agent, or Firm* — Meyertons, Hood, Kivlin, Kowert & Goetzel, P.C.; Stephen J. Curran

(57) ABSTRACT

A microprocessor includes a cache memory, a prefetch unit, and detection logic. The prefetch unit may be configured to monitor memory accesses that miss in the cache and to determine whether to prefetch one or more blocks of memory from a system memory based upon previous memory accesses. The prefetch unit may be further configured to use addresses of the memory accesses that miss to calculate each next memory block to prefetch. The detection logic may be configured to provide a notification to the prefetch unit in response to detecting a memory access instruction including a particular hint. In response to receiving the notification, the prefetch unit may be configured to inhibit using an address associated with the memory access instruction including the particular hint, when calculating subsequent memory blocks to prefetch.

20 Claims, 4 Drawing Sheets

PROCESSOR AND METHOD FOR USING AN INSTRUCTION HINT TO PREVENT HARDWARE PREFETCH FROM USING CERTAIN MEMORY ACCESSES IN PREFETCH CALCULATIONS

BACKGROUND OF THE INVENTION

1. Field of the Invention

This invention relates to microprocessors and, more particularly, hardware prefetching.

2. Description of the Related Art

Modern microprocessors attempt to detect patterns in memory accesses and to prefetch memory locations into the processor caches in an effort to reduce latencies associated with memory accesses. However, some access patterns may cause the prefetch hardware to prefetch memory blocks that will not be used. Since the caches are limited in size, the unused blocks may cause useful blocks to be flushed from the caches.

One example, of a pattern that does not lend itself to efficient hardware prefetching is a pattern created by "walking" through the elements of a linked list, and reading some of the data in the objects in the linked list. If reading the data in each object reads in enough cache lines to trigger the hardware prefetcher, it is unlikely that the next sequential data fetched is likely to be accessed soon. Accordingly, in this case, valuable cache space may be wasted, and the useful data may be evicted.

SUMMARY

Various embodiments of a processor and method for using an instruction hint to prevent hardware prefetch from using certain memory access in the prefetch calculations are disclosed. In one embodiment, a microprocessor includes a cache memory, a prefetch unit, and detection logic. The prefetch unit may be configured to monitor memory accesses such as accesses that miss in the cache memory, for example, and to determine whether to prefetch one or more blocks of memory from a system memory based upon previous memory accesses. The prefetch unit may be further configured to use addresses of the memory accesses that miss to calculate each next memory block to prefetch. The detection logic may be configured to provide a notification to the prefetch unit in response to detecting a memory access instruction including a particular hint. In response to receiving the notification, the prefetch unit may be configured to inhibit using an address associated with the memory access instruction including the particular hint, when calculating subsequent memory blocks to prefetch.

In another embodiment, a method includes a prefetch unit monitoring memory accesses and determining whether to prefetch one or more blocks of memory from a system memory based upon previous memory accesses. The method also includes calculating each next memory block to prefetch using addresses of the memory accesses, and in response to detecting a memory access instruction including a particular hint, providing a notification to the prefetch unit. The method further includes, in response to receiving the notification, the prefetch unit discarding an address associated with the memory access instruction including the particular hint so that calculations of subsequent memory blocks to prefetch do not include the discarded address.

Figure 1:
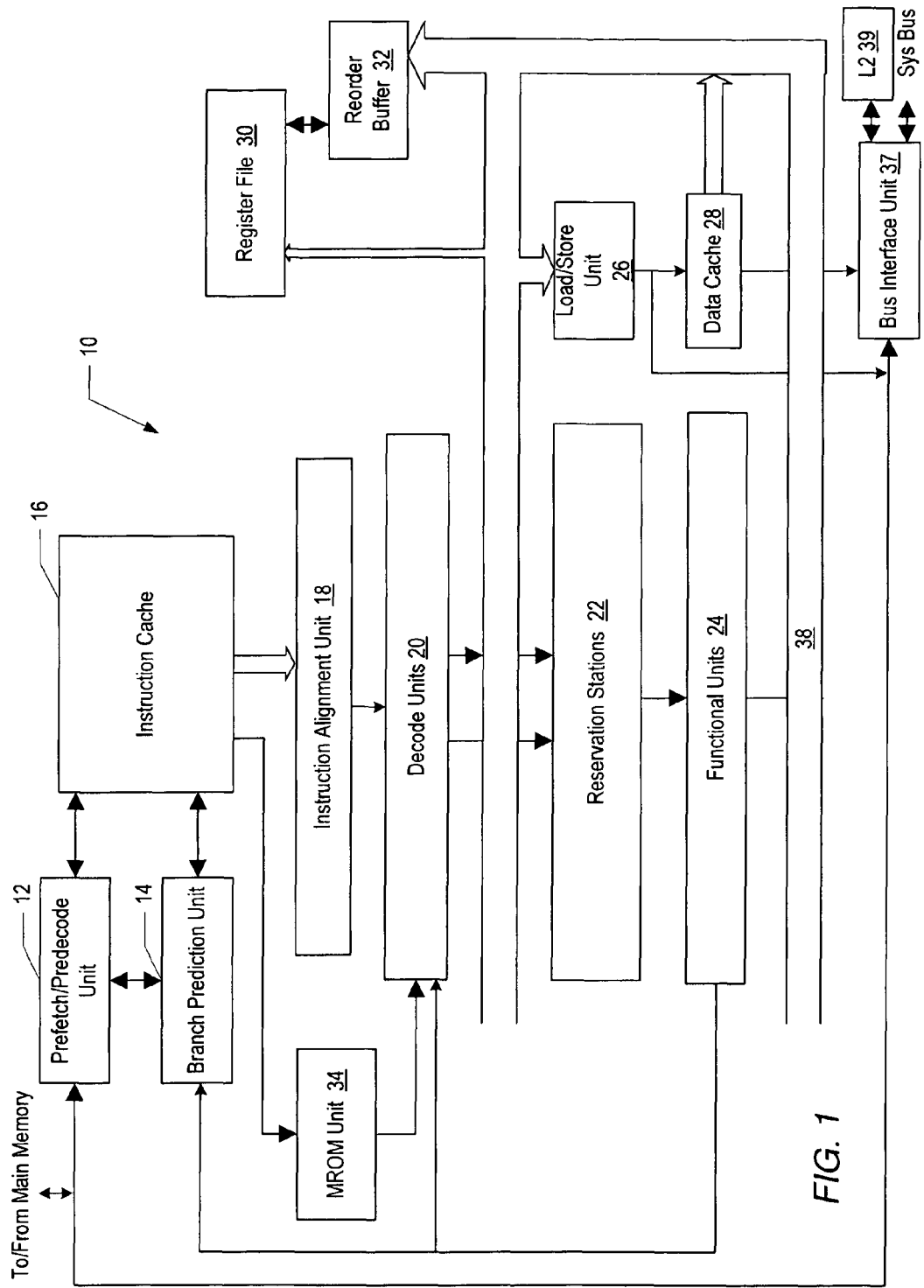
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. It is noted that the word "may" is used throughout this application in a permissive sense (i.e., having the potential to, being able to), not a mandatory sense (i.e., must).

DETAILED DESCRIPTION

Turning now to FIG. 1, a block diagram of one embodiment of a processor 10 is shown. Other embodiments are possible and contemplated. As shown in FIG. 1, processor 10 includes a prefetch/predecode unit 12, a branch prediction unit 14, an instruction cache 16, an instruction alignment unit 18, decode units 20, reservation stations 22, functional units 24, a load/store unit 26, a data cache 28, a register file 30, a reorder buffer 32, an MROM unit 34, a bus interface unit 37, and an L2 cache 39. It noted that each of decode units 20, reservation stations 22, and functional units 24 may include any number of independent units. For example, in a superscalar processor, there may be multiple pipelines each having respective decode units, reservation stations and functional units. However, in the illustrated embodiment, a single block is shown for simplicity.

Prefetch/predecode unit 12 is coupled to receive instructions from bus interface unit 37, and is further coupled to instruction cache 16 and branch prediction unit 14. Similarly, branch prediction unit 14 is coupled to instruction cache 16. Still further, branch prediction unit 14 is coupled to decode units 20 and functional units 24. Instruction cache 16 is further coupled to MROM unit 34 and instruction alignment unit 18. Instruction alignment unit 18 is in turn coupled to decode units 20. Decode units 20 is coupled to load/store unit 26 and to reservation stations 22. Reservation stations 22 is further coupled to respective functional units 24. Additionally, decode units 20 and reservation stations 22 are coupled to register file 30 and reorder buffer 32. Functional units 24 are coupled to load/store unit 26, register file 30, and reorder buffer 32 as well. Data cache 28 is coupled to load/store unit 26 and to bus interface unit 37. Bus interface unit 37 is further coupled to L2 cache 39 and a bus. Finally, MROM unit 34 is coupled to decode units 20.

Instruction cache 16 is a high-speed cache memory provided to store instructions. Instructions are fetched from instruction cache 16 and dispatched to decode units 20. In one embodiment, instruction cache 16 is configured to store up to 64 kilobytes of instructions in a 2 way set associative structure having 64 byte lines (a byte comprises 8 binary bits). Alternatively, any other desired configuration and size may be employed. For example, it is noted that instruction cache 16 may be implemented as a fully associative, set associative, or direct mapped configuration.

Instructions are stored into instruction cache 16 by prefetch/predecode unit 12. Instructions and/or data may be prefetched prior to the request thereof from instruction cache 16 or load/store unit 26 in accordance with a prefetch scheme.

A variety of prefetch schemes may be employed by prefetch/predecode unit 12. As prefetch/predecode unit 12 transfers instructions to instruction cache 16, prefetch/predecode unit 12 may generate predecode bits for each byte of the instructions. In one embodiment three predecode bits are used: a start bit, an end bit, and a functional bit. The predecode bits form tags indicative of the boundaries of each instruction. The predecode tags may also convey additional information such as whether a given instruction can be decoded directly by decode units 20 or whether the instruction is executed by invoking a microcode procedure controlled by MROM unit 34, as will be described in greater detail below. Still further, prefetch/predecode unit 12 may be configured to detect branch instructions and to store branch prediction information corresponding to the branch instructions into branch prediction unit 14. Other embodiments may employ any suitable predecode scheme.

Instructions which may be directly decoded by decode units 20 are referred to as "fast path" instructions. The remaining x86 instructions are referred to as MROM instructions, according to one embodiment. MROM instructions are instructions which are determined to be too complex for decode by decode units 20. MROM instructions are executed by invoking MROM unit 34. More specifically, when an MROM instruction is encountered, MROM unit 34 parses and issues the instruction into a subset of defined fast path instructions to effectuate the desired operation. MROM unit 34 dispatches the subset of fast path instructions to decode units 20.

In the illustrated embodiment, processor 10 employs branch prediction in order to speculatively fetch instructions subsequent to conditional branch instructions. Branch prediction unit 14 is included to perform branch prediction operations. Decode units 20 and functional units 24 may provide update information to branch prediction unit 14. Decode units 20 may detect branch instructions which were not predicted by branch prediction unit 14. Functional units 24 execute the branch instructions and determine if the predicted branch direction is incorrect. The branch direction may be "taken," in which subsequent instructions are fetched from the target address of the branch instruction. Conversely, the branch direction may be "not taken," in which subsequent instructions are fetched from memory locations consecutive to the branch instruction. When a mispredicted branch instruction is detected, instructions subsequent to the mispredicted branch are discarded from the various units of processor 10. In an alternative configuration, branch prediction unit 14 may be coupled to reorder buffer 32 instead of decode units 20 and functional units 24, and may receive branch misprediction information from reorder buffer 32. A variety of suitable branch prediction algorithms may be employed by branch prediction unit 14.

Instructions fetched from instruction cache 16 are conveyed to instruction alignment unit 18. As instructions are fetched from instruction cache 16, the corresponding predecode data is scanned to provide information to instruction alignment unit 18 (and to MROM unit 34) regarding the instructions being fetched. Instruction alignment unit 18 utilizes the scanning data to align an instruction to each of decode units 20. In one embodiment, instruction alignment unit 18 aligns instructions from three sets of eight instruction bytes to decode units 20.

Decode units 20 are configured to decode instructions received from instruction alignment unit 18. Register operand information is detected and routed to register file 30 and reorder buffer 32. Additionally, if the instructions require one or more memory operations to be performed, decode units 20 dispatch the memory operations to load/store unit 26. Each instruction is decoded into a set of control values for functional units 24, and these control values are dispatched to reservation stations 22 along with operand address information and displacement or immediate data which may be included with the instruction. In one particular embodiment, each instruction is decoded into up to two operations which may be separately executed by functional units 24A-24C.

As described in greater detail below, in one embodiment, detection logic 220 (shown in FIG. 2) may also detect hints that may either be part of an instruction or the hints may be special instructions that serve as hints to the processing hardware. More particularly, in one embodiment, detection logic 220 may detect hints that direct the prefetch unit 12 not to prefetch data associated with an address at a given location. It is noted that the hint detection logic 220 may be implemented with the decode units 20, the functional units 24, or predecode unit 12, as desired.

Processor 10 supports out of order execution, and thus employs reorder buffer 32 to keep track of the original program sequence for register read and write operations, to implement register renaming, to allow for speculative instruction execution and branch misprediction recovery, and to facilitate precise exceptions.

The instruction control values and immediate or displacement data provided at the outputs of decode units 20 are routed directly to respective reservation stations 22. In one embodiment, each reservation station 22 is capable of holding instruction information (i.e., instruction control values as well as operand values, operand tags and/or immediate data) for up to six pending instructions awaiting issue to the corresponding functional unit.

Upon decode of a particular instruction, if a required operand is a register location, register address information is routed to reorder buffer 32 and register file 30 simultaneously. Those of skill in the art will appreciate that the x86 register file includes eight 32 bit real registers (i.e., typically referred to as EAX, EBX, ECX, EDX, EBP, ESI, EDI and ESP). In embodiments of processor 10 which employ the x86 processor architecture, register file 30 comprises storage locations for each of the 32 bit real registers. Additional storage locations may be included within register file 30 for use by MROM unit 34.

As noted earlier, reservation stations 22 store instructions until the instructions are executed by the corresponding functional unit 24. An instruction is selected for execution if: (i) the operands of the instruction have been provided; and (ii) the operands have not yet been provided for instructions which are within the same reservation station 22 and which are prior to the instruction in program order. It is noted that when an instruction is executed by one of the functional units 24, the result of that instruction is passed directly to any reservation station 22 that is waiting for that result at the same time the result is passed to update reorder buffer 32 (this technique is commonly referred to as "result forwarding"). An instruction may be selected for execution and passed to a functional unit 24 during the clock cycle that the associated result is forwarded. Reservation stations 22 route the forwarded result to the functional unit 24 in this case. In embodiments in which instructions may be decoded into multiple operations to be executed by functional units 24, the operations may be scheduled separately from each other.

In one embodiment, each of the functional units 24 is configured to perform integer arithmetic operations of addition and subtraction, as well as shifts, rotates, logical operations, and branch operations. The operations are performed in response to the control values decoded for a particular instruction by decode units 20. It is noted that a floating point unit (not shown) may also be employed to accommodate floating point operations. The floating point unit may be operated as a coprocessor, receiving instructions from MROM unit 34 or reorder buffer 32 and subsequently communicating with reorder buffer 32 to complete the instructions. Additionally, functional units 24 may be configured to perform address generation for load and store memory operations performed by load/store unit 26. In one particular embodiment, each functional unit 24 may comprise an address generation unit for generating addresses and an execute unit for performing the remaining functions. The two units may operate independently upon different instructions or operations during a clock cycle.

Each of the functional units 24 also provides information regarding the execution of conditional branch instructions to the branch prediction unit 14. If a branch prediction was incorrect, branch prediction unit 14 flushes instructions subsequent to the mispredicted branch that have entered the instruction processing pipeline, and causes fetch of the required instructions from instruction cache 16 or main memory. It is noted that in such situations, results of instructions in the original program sequence which occur after the mispredicted branch instruction are discarded, including those which were speculatively executed and temporarily stored in load/store unit 26 and reorder buffer 32. It is further noted that branch execution results may be provided by functional units 24 to reorder buffer 32, which may indicate branch mispredictions to functional units 24 and branch prediction unit 14.

Results produced by functional units 24 are sent to reorder buffer 32 if a register value is being updated, and to load/store unit 26 if the contents of a memory location are changed. If the result is to be stored in a register, reorder buffer 32 stores the result in the location reserved for the value of the register when the instruction was decoded. A plurality of result buses 38 is included for forwarding of results from functional units 24 and load/store unit 26. Result buses 38 convey the result generated, as well as the reorder buffer tag identifying the instruction being executed. It is noted that as described above, in one particular implementation, the functional units 24 may be configured to detect the presence of the no-prefetch hint. Accordingly, in such an implementation, the functional units 24 may provide a no-prefetch signal to the prefetch unit.

Load/store unit 26 provides an interface between functional units 24 and data cache 28. In one embodiment, load/store unit 26 is configured with a first load/store buffer having storage locations for data and address information for pending loads or stores which have not accessed data cache 28 and a second load/store buffer having storage locations for data and address information for loads and stores which have accessed data cache 28. For example, the first buffer may comprise 12 locations and the second buffer may comprise 32 locations. Decode units 20 arbitrate for access to the load/store unit 26. When the first buffer is full, a decode unit must wait until load/store unit 26 has room for the pending load or store request information. Load/store unit 26 also performs dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation. Additionally, load/store unit 26 may include a special register storage for special registers such as the segment registers and other registers related to the address translation mechanism defined by the x86 processor architecture.

Data cache 28 is a high-speed cache memory provided to temporarily store data being transferred between load/store unit 26 and the main memory subsystem. In one embodiment, data cache 28 has a capacity of storing up to 64 kilobytes of data in an two way set associative structure. It is understood that data cache 28 may be implemented in a variety of specific memory configurations, including a set associative configuration, a fully associative configuration, a direct-mapped configuration, and any suitable size of any other configuration.

In one particular embodiment of processor 10 employing the x86 processor architecture, instruction cache 16 and data cache 28 are linearly addressed and physically tagged. The linear address is formed from the offset specified by the instruction and the base address specified by the segment portion of the x86 address translation mechanism. Linear addresses may optionally be translated to physical addresses for accessing a main memory. The linear to physical translation is specified by the paging portion of the x86 address translation mechanism. The physical address is compared to the physical tags to determine a hit/miss status.

Bus interface unit 37 is configured to communicate between processor 10 and other components in a computer system via a system bus. For example, the bus may be compatible with the EV-6 bus developed by Digital Equipment Corporation. Alternatively, any suitable interconnect structure may be used including packet-based, unidirectional or bi-directional links, etc. Bus interface unit 37 may further communicate with L2 cache 39.

In one implementation, L2 cache 39 may be a second level cache storing both instructions and data. L2 cache 39 may be, for example, 256 kilobytes, 512 kilobytes, or 1 Megabyte in size. Other embodiments may use smaller or larger sizes. L2 cache 39 may employ direct mapped or set associative configurations.

Figure 2:
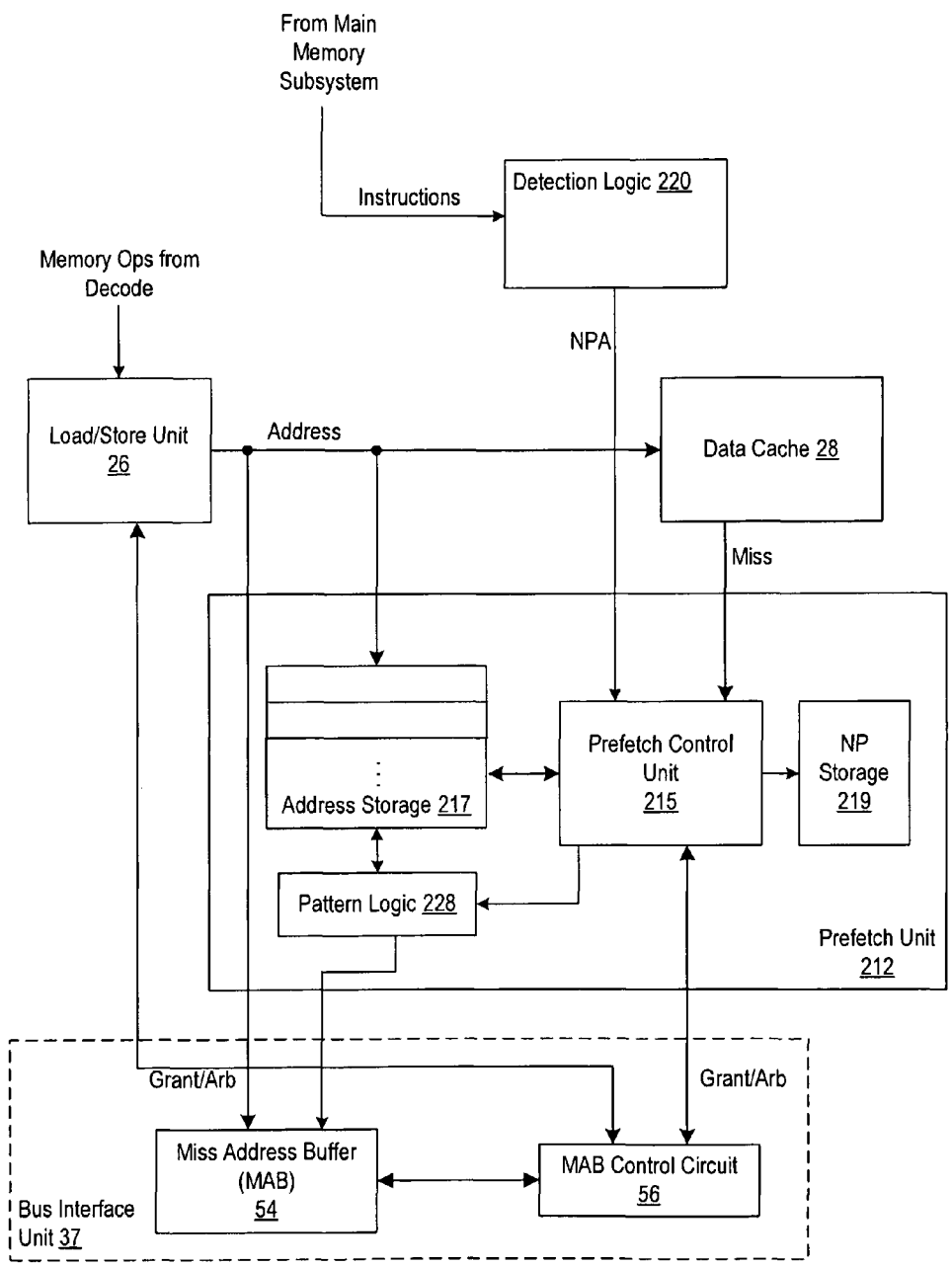
FIG. 2 is a block diagram depicting more detailed aspects of the embodiment of the processor shown in FIG. 1.

Turning now to FIG. 2, a block diagram illustrating depicting more detailed aspects of the processor of FIG. 1 is shown. Other embodiments are possible and contemplated. In the embodiment of FIG. 2, detection logic 220 is coupled to prefetch unit 212 and load/store unit 26 is coupled to data cache 28 and to prefetch unit 212, as well as bus interface unit 37. As noted above, in various embodiments, detection logic 220 may be part of decode units, functional units 24 or pre-decode unit 12.

In the illustrated embodiment, prefetch unit 212 includes a prefetch control unit 215, an address storage 217, pattern logic 228, and a no-prefetch storage, designated NP 218. Bus interface unit 37 includes a miss address buffer, or MAB 54 and MAB control circuit 56. Load/store unit 26 is coupled to provide an address to data cache 28, MAB 54 and address storage 217 and is further coupled to MAB control circuit 56 via a grant/arb interface. Data cache 28 is coupled to provide a miss signal to prefetch control unit 215. Prefetch control unit 215 is coupled to address storage 217 and to pattern logic 228. Address storage 217 is coupled to pattern logic 228, which is further coupled to MAB 54. Prefetch control unit 215 is coupled to MAB control circuit 56 via another grant/arb interface.

Generally, prefetch unit 212 is configured to generate prefetch addresses. Prefetch unit 212 monitors the addresses that miss data cache 28 to detect patterns in the miss stream, and generates prefetch addresses in response to the detected patterns using any of a variety of detection methods including stride detection, for example. More particularly, prefetch unit 212 may in one implementation, attempt to detect a stride access pattern among miss addresses and may generate the next address in the pattern if a strided access pattern is detected. A stride access pattern may exist if consecutive addresses in the pattern are separated by a fixed stride amount. Other addresses which are not included in the pattern may intervene between consecutive addresses in the pattern. The next address in the pattern may be generated by adding the stride amount to the most recent address in the pattern.

Prefetch unit 212 employs address storage 217 to record information from the miss addresses which have been observed by prefetch unit 212. Address storage 217 comprises at least one entry, and may include N entries (where N is any positive integer). Pattern logic 228 may detect patterns in the miss addresses stored in address storage 217. In one implementation, each entry may represent a pattern of miss addresses, where consecutive addresses within the pattern are separated by a fixed stride amount. The more addresses which have matched the pattern, the more likely the pattern may be to repeat itself in the future. Prefetch control unit 215 may receive the miss signal from data cache 28 (which may indicate, when asserted, that the address presented to data cache 28 by load/store unit 26 is a miss in data cache 28), and may update the address storage 217 when a miss address is received. While a miss signal is used in the present embodiment, other embodiments may use a hit signal or any other indication of the hit/miss status of an address presented to data cache 28.

However, as mentioned above, if detection logic 220 detects an instruction with a hint that indicates not to use the address associated with the instruction in calculations to prefetch data, the prefetch control unit 215 is notified, by the detection logic 220, using the no-prefetch address (NPA) signal. In one embodiment, the NPA signal includes an indication such as the associated address, and may include other a flag bits. In response to prefetch control unit 215 receiving the NPA signal, prefetch control unit 215 inhibits the associated address from being stored in the address storage 217 and subsequently used in the prefetch algorithm. In one embodiment, the no-fetch address may be stored within the NP storage 218 so that when an address misses in the cache, the prefetch control unit 215 may check the NP storage 218 before allowing the miss address to be stored within address storage 217.

In various embodiments, the hint may be included in an instruction. For example, a standard memory access instruction may be modified such that one or more unused bits in the instruction may be encoded, or a special encoding of certain bits of the instruction may be used to identify the instruction as having the hint. In addition, the hint may also be special non-standard memory access instruction that may be used in lieu of a standard memory access instruction. For example, a standard instruction such as a load instruction with a special prefix added that identifies the instruction as having a no-prefetch hint to create a non-standard instruction. In one embodiment, the special encoding and/or the special instructions may be selected automatically by the compiler, or specified manually by a programmer.

As described in greater detail below in conjunction with the description of FIG. 4, in an alternative embodiment, the detection logic 220 may cause a no-prefetch tag or bit(s) to be added to an instruction. Thus, when the functional units 24 generate the address that is sent to the load/store unit 26 if the contents of a memory location are changed, this no-prefetch tag may be appended to the address so that the address is stored within address storage 217 with the tag. Accordingly, when the pattern logic 228 calculates the next addresses to prefetch, if the tag indicates the address is a no-prefetch address, the address is discarded and not used in the prefetch calculations for subsequent prefetches.

In one embodiment, when a cache miss address is received by prefetch control unit 215, the miss address is compared to the addresses recorded in address storage 217 to determine if the miss address matches any of the recorded patterns. If prefetch control unit 215 detects that the miss address matches one of the recorded patterns, prefetch control unit 215 may increment the confidence counter in the corresponding entry and may store the miss address in the corresponding entry. If the miss address does not match one of the recorded patterns, prefetch control unit 215 may allocate an entry in address storage 217 to the address. In this manner, new patterns of stride patterns may be detected.

As mentioned above, in the illustrated embodiment, prefetch unit 212 may monitor the addresses which miss in the data cache 28. By monitoring the miss addresses, the addresses which hit in data cache 28 may be filtered out, and thus the number of patterns which need to be recorded in any given case to provide accurate prefetching may be smaller (allowing for a smaller address storage 217). Likewise by filtering out addresses that are known to not be beneficial (such as those marked with a no-prefetch hint), more accurate prefetching may be performed. Furthermore, addresses which are hitting in data cache 28 may not benefit as much from prefetching, and thus ignoring the hit addresses may not impact the performance benefits of prefetching. Still further, in the illustrated embodiment, cache misses from data cache 28 may occur in program order. Other misses, such as L2 cache misses, may not occur in program order and thus detecting a stride pattern may be more difficult (since the pattern exists among consecutive addresses in the pattern). Other embodiments may monitor all addresses presented to data cache 28, if desired.

In various embodiments, prefetch unit 212 (and more particularly prefetch control unit 215) may arbitrate for a miss address buffer entry for prefetch addresses with load/store unit 26 (which is performing memory operations in response to the actual instruction execution). Generally, miss address buffer 54 may comprise one or more entries for addresses which miss in the caches of processor 10 and thus are to be conveyed to the memory system to fetch the corresponding cache line for storage in the cache (and for use by processor 10). MAB control circuit 56 may control the arbitration and allocation of MAB entries to load/store unit 26 and/or prefetch unit 212B. In some embodiments, other sources may arbitrate for MAB entries as well, as desired (e.g. instruction cache 16 may arbitrate for instruction fetch misses). In response to determining that a prefetch should begin, prefetch control unit 215 may asserts its arb signal to MAB control circuit 56. If MAB control circuit 56 grants a MAB entry to prefetch unit 212B, MAB control circuit 56 may assert the grant signal to prefetch control unit 215. Prefetch control unit 215 may then arbitrate for another prefetch address, if desired, or may deassert its arb signal.

Similarly, if load/store unit 26 is ready to initiate a fill for a memory operation which misses data cache 28, load/store unit 26 may assert its arb signal to arbitrate for a MAB entry. If MAB control circuit 56 grants a MAB entry to load/store unit 26, MAB control circuit 56 may assert the grant signal to load/store unit 26. If both load/store unit 26 and prefetch unit 40 are arbitrating for a MAB entry, load/store unit 26 may be given priority since load/store unit 26 is performing load/store memory operations from the code being executed by processor 10 while prefetch unit 212B is generating prefetch addresses which are not directly in response to the code being executed.

In one embodiment, processor 10 may store prefetched cache lines into the L2 cache 39. For such an embodiment, bus interface unit 37 may detect the prefetch type field encoding and may route the prefetched cache line to L2 cache 39 for storage. By prefetching into L2 cache 39, pollution of the data cache 28 may be avoided (i.e. the replacing of useful data with prefetch data which may not be used). Pollution may be less of a factor in the larger L2 cache than it is for data cache 28, since the L2 cache is larger and may, in some cases, have a higher set associativity. Prefetching into the L2 may be preferable to prefetching into a dedicated buffer, since the area to implement the buffer is not consumed and the complexity of routing prefetch cache lines to the dedicated buffer (rather than one of the caches) may be avoided.

As used herein, a "level one" (L1) cache may be the cache which is accessed first in the cache hierarchy by the processor to respond to a memory operation required by the code sequence being executed. Thus, in the embodiment of FIG. 2, data cache 28 may be an L1 cache. The "level two" (L2) cache may be the next cache down the hierarchy from the L1 cache, and thus may be accessed after the L1 cache. In some cases, the L1 and L2 accesses may be started concurrently, and the L2 access may be cancelled if the L1 access is a hit. Furthermore, a "hit" in a cache occurs if the data corresponding to an address is stored in the cache when the address accesses the cache, and a "miss" in a cache occurs if the data is not stored in the cache when the address accesses the cache. A "cache line" is the smallest unit of allocation and deallocation of memory in the cache.

Figure 3:
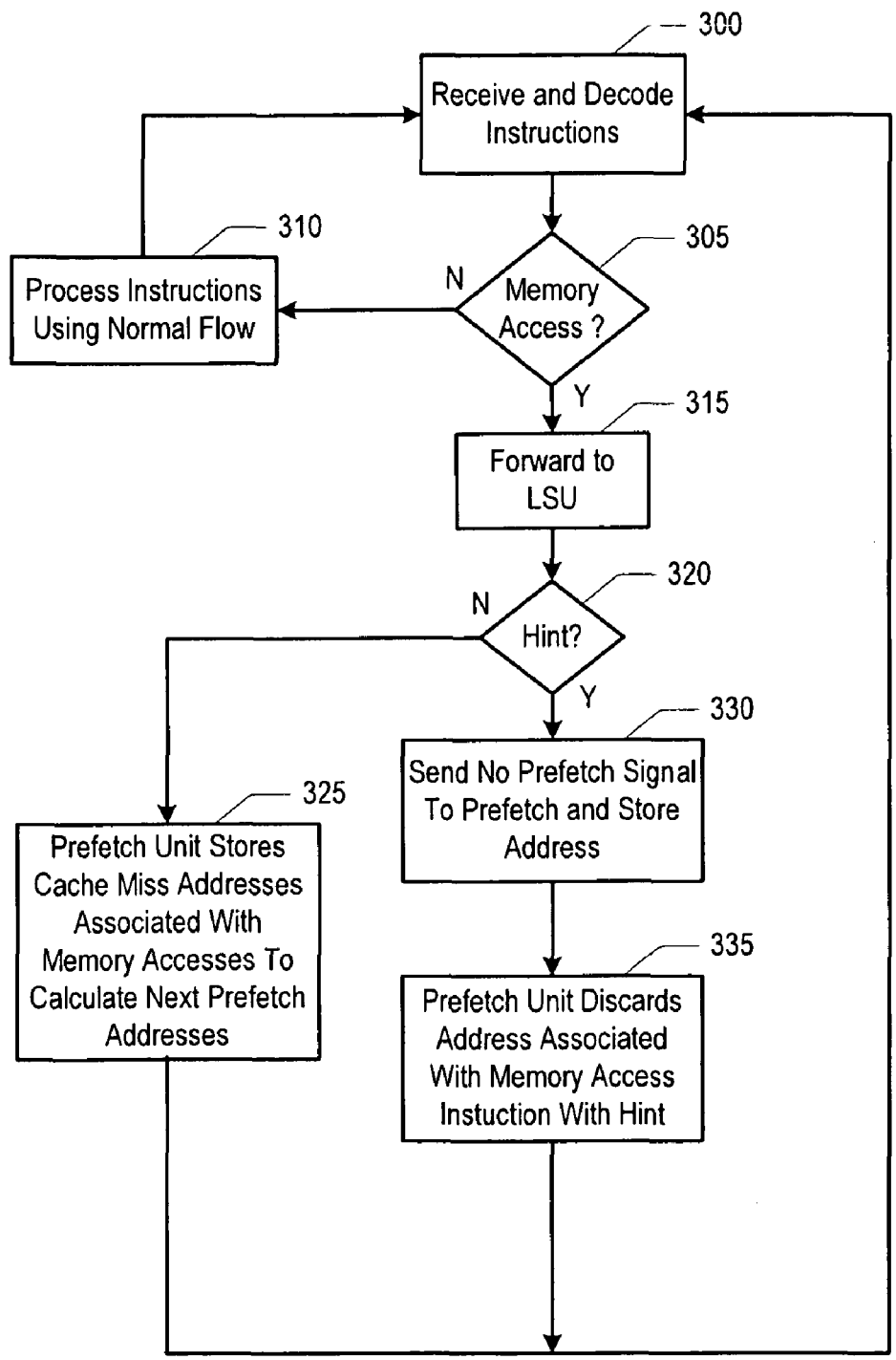
FIG. 3 is a flow diagram that describes operational aspects of the embodiments shown in FIG. 1 and FIG. 2.

In FIG. 3, a flow diagram describing the operation of the embodiments of FIG. 1 and FIG. 2 is shown. Referring collectively to FIG. 1 through FIG. 3, and beginning in block 300 of FIG. 3, the decode unit 20 may receive and decode instructions fetched from a main system memory. If the instruction is not a memory access instruction (block 305), the instruction may be processed as described above using a normal process flow (block 310). However, if the instruction is a memory access instruction (block 305), when the instruction gets to the decode units 20, the corresponding memory operations may be forwarded to the load/store unit 26 (block 315).

In addition, if the detection logic 220 detects that the received instruction includes a no-prefetch hint (block 320), the detection logic 220 may provide a no-prefetch signal to the prefetch unit 212. As described above, in one embodiment, the no-prefetch signal includes the associated address. Accordingly, as described above in one embodiment, the prefetch control unit 215 may store the address within NP storage 219 (block 330). If the address misses in the data cache 28, prefetch unit 212 may not use that address in any subsequent prefetch calculations. In addition, in one embodiment, once the address misses in the cache, the address may be discarded from the NP storage 219.

However, referring back to block 320, if the instruction does not include a no-prefetch hint, and if the address misses in the data cache 28, the address may be stored and used by prefetch unit 212 during subsequent calculations of which addresses to prefetch (block 325) as described above.

Figure 4:
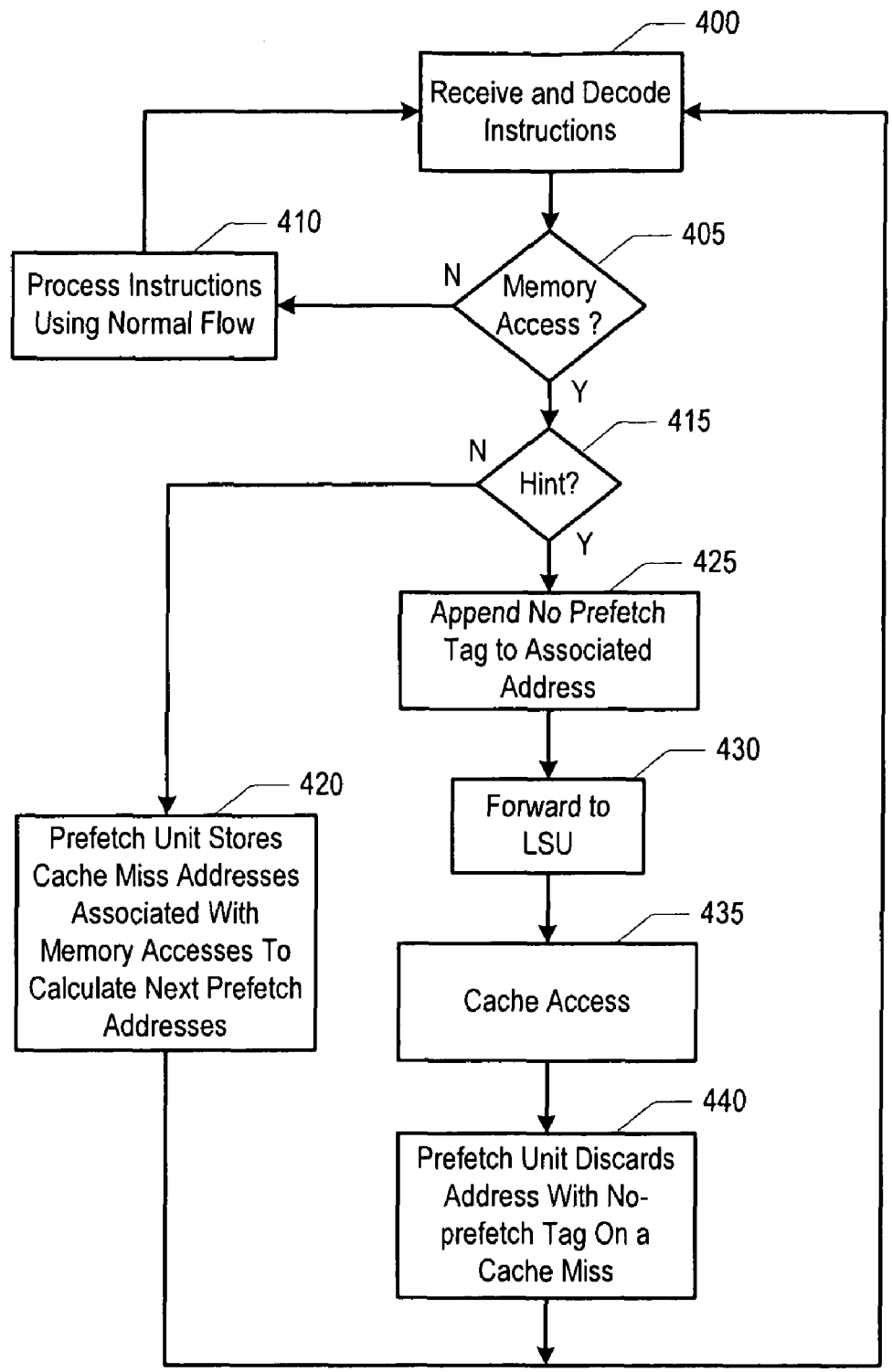
FIG. 4 is a flow diagram that describes operational aspects of an alternative embodiment of the processor shown in FIG. 1 and FIG. 2.

Turning to FIG. 4, a flow diagram describing the operation of an alternative embodiment of the processor of FIG. 1 and FIG. 2 is shown. Referring collectively to FIG. 1, FIG. 2, and FIG. 4, and beginning in block 400 of FIG. 4, the decode unit 20 may receive and decode instructions fetched from a main system memory.

If the instruction is not a memory access instruction (block 405), the instruction may be processed as described above using a normal process flow (block 410). However, if the instruction is a memory access instruction (block 405), the instruction may be decoded by decode units 20. If the detection logic 220 detects that the received instruction includes a no-prefetch hint (block 415), a no-prefetch tag may be appended to the corresponding memory operation. In addition, when the functional units 24 generate the address, the no-prefetch tag may be appended to the address. The address and memory operations may be forwarded to the load/store unit 26 (block 430).

When the load/store unit 26 accesses the data cache 28 (block 435), the address is stored within the MAB 54. However, if the no-prefetch tag indicates the address is associated with an instruction with a no-prefetch hint, even on a cache miss, the address is discarded and not stored within the address storage 217. Thus, prefetch unit 212 may not use that address in any subsequent prefetch calculations.

Referring back to block 415, if the decode unit 20 detects that the received instruction does not include a no-prefetch hint, and if the address misses in the data cache 28, the address may be stored within address storage 217 and used by prefetch unit 212 during subsequent calculations of which addresses to prefetch (block 420) as described above.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   a prefetch unit monitoring memory accesses and determining whether to prefetch one or more blocks of memory from a system memory based upon previous memory accesses;
   detecting memory access patterns using addresses of the previous memory accesses;
   calculating each next memory block to prefetch using addresses of the memory accesses;
   in response to detecting a memory access instruction including a particular hint, providing a notification; and
   in response to receiving the notification, the prefetch unit discarding an address associated with the memory access instruction including the particular hint so that calculations of subsequent memory blocks to prefetch do not include the discarded address.

2. The method as recited in claim 1, wherein the memory access instruction including a the particular hint comprises a non-standard memory access instruction.

3. The method as recited in claim 1, further comprising creating the memory access instruction including a the particular hint by modifying a standard memory access instruction to have one or more bits include a particular encoding.

4. The method as recited in claim 1, further comprising the prefetch unit discarding the address associated with the memory access instruction including the particular hint in response to receiving the notification.

5. The method as recited in claim 1, wherein providing a notification further comprises appending a tag to a memory operation corresponding to the memory access instruction including the particular hint.

6. The method as recited in claim 1, further comprising a compiler automatically replacing a standard memory access instruction with the memory access instruction including the particular hint within an instruction sequence.

7. The method as recited in claim 1, further comprising a programmer user manually replacing a standard memory access instruction with the memory access instruction including the particular hint within an instruction sequence.

8. A microprocessor comprising:
a cache memory;
a prefetch unit coupled to the cache memory and configured to monitor memory accesses and to determine whether to prefetch one or more blocks of memory from a system memory based upon previous memory accesses, wherein the prefetch unit is further configured to detect memory access patterns using addresses of the previous memory accesses to calculate each next memory block to prefetch; and
detection logic configured to provide a notification in response to detecting a memory access instruction including a particular hint;
wherein in response to receiving the notification, the prefetch unit is configured to inhibit using an address associated with the memory access instruction including the particular hint, to calculate subsequent memory blocks to prefetch.

9. The microprocessor as recited in claim 8, wherein the memory access instruction including the particular hint comprises a non-standard memory access instruction.

10. The microprocessor as recited in claim 8, wherein the memory access instruction including the particular hint comprises a modified standard memory access instruction with one or more bits having a particular encoding.

11. The microprocessor as recited in claim 8, wherein the prefetch unit is further configured to discard the address associated with the memory access instruction including the particular hint in response to receiving the notification.

12. The microprocessor as recited in claim 8, wherein the notification comprises a tag appended to a memory operation corresponding to the memory access instruction including the particular hint.

13. The microprocessor as recited in claim 8, wherein a standard memory access instruction is replaced by the memory access instruction including the particular hint within an instruction sequence automatically by a compiler.

14. The microprocessor as recited in claim 8, wherein a standard memory access instruction is replaced by the memory access instruction including the particular hint within an instruction sequence manually by a programmer user.

15. A computer system comprising:
a system memory; and
a microprocessor coupled to the system memory, wherein the microprocessor includes:
a cache memory;
a prefetch unit coupled to the cache memory and configured to monitor memory accesses and to determine whether to prefetch one or more blocks of memory from the system memory based upon previous memory accesses, wherein the prefetch unit is further configured to detect memory access patterns using addresses of the previous memory accesses to calculate each next memory block to prefetch; and
detection logic configured to provide a notification in response to detecting a memory access instruction including a particular hint;
wherein in response to receiving the notification, the prefetch unit is configured to inhibit using an address associated with the memory access instruction including the particular hint to calculate subsequent memory blocks to prefetch.

16. The system as recited in claim 15, wherein the memory access instruction including the particular hint comprises a non-standard memory access instruction.

17. The system as recited in claim 15, wherein the memory access instruction including the particular hint comprises a modified standard memory access instruction with one or more bits having a particular encoding.

18. The system as recited in claim 15, wherein the prefetch unit is further configured to discard the address associated with the memory access instruction including the particular hint in response to receiving the notification.

19. The system as recited in claim 15, wherein the prefetch unit is further configured to use addresses of memory accesses that miss within the cache memory to calculate subsequent memory blocks to prefetch.

20. The system as recited in claim 15, wherein a standard memory access instruction is replaced by the memory access instruction including the particular hint within an instruction sequence automatically by a compiler.

* * * * *